United States Patent
De Palma et al.

(10) Patent No.: US 9,748,570 B2
(45) Date of Patent: *Aug. 29, 2017

(54) POSITIVE ELECTRODE MATERIAL HAVING A SIZE DEPENDENT COMPOSITION

(75) Inventors: Randy De Palma, Seoul (KR); Jens Paulsen, Daejeon (KR); JiHye Kim, Baeksogdong (KR)

(73) Assignee: Umicore, Brussels (BE)

( * ) Notice: Subject to any disclaimer, the term of this patent is extended or adjusted under 35 U.S.C. 154(b) by 726 days.

This patent is subject to a terminal disclaimer.

(21) Appl. No.: 14/119,924

(22) PCT Filed: May 14, 2012

(86) PCT No.: PCT/EP2012/058896
§ 371 (c)(1),
(2), (4) Date: Feb. 4, 2014

(87) PCT Pub. No.: WO2012/163660
PCT Pub. Date: Dec. 6, 2012

(65) Prior Publication Data
US 2014/0175329 A1    Jun. 26, 2014

Related U.S. Application Data

(60) Provisional application No. 61/457,825, filed on Jun. 13, 2011.

(30) Foreign Application Priority Data

May 30, 2011   (EP) ..................................... 11168124

(51) Int. Cl.
*H01M 4/525*   (2010.01)
*H01M 4/505*   (2010.01)
*H01M 10/0525*   (2010.01)

(52) U.S. Cl.
CPC ........... *H01M 4/525* (2013.01); *H01M 4/505* (2013.01); *H01M 10/0525* (2013.01)

(58) Field of Classification Search
CPC .................................................... H01M 4/525
USPC .................................................... 252/182.1
See application file for complete search history.

(56) References Cited

U.S. PATENT DOCUMENTS

| | | | |
|---|---|---|---|
| 8,673,170 B2 * | 3/2014 | Levasseur ............... | C01G 51/42 252/182.1 |
| 8,753,532 B2 * | 6/2014 | Levasseur ........... | H01M 4/1391 252/182.1 |
| 2004/0197658 A1 * | 10/2004 | Kase ..................... | H01M 4/525 429/231.1 |
| 2007/0048597 A1 | 3/2007 | Ryu et al. | |
| 2010/0081055 A1 | 4/2010 | Konishi et al. | |
| 2010/0099027 A1 * | 4/2010 | Kikuya ................. | H01M 4/366 429/223 |
| 2010/0264363 A1 * | 10/2010 | Paulsen .............. | C01G 45/1228 252/182.1 |
| 2011/0240913 A1 * | 10/2011 | Kim ................... | C01G 45/1228 252/182.1 |
| 2012/0104311 A1 * | 5/2012 | Levasseur ............. | C01G 51/42 252/182.1 |
| 2014/0175329 A1 * | 6/2014 | De Palma ............. | H01M 4/505 252/182.1 |

FOREIGN PATENT DOCUMENTS

| | | |
|---|---|---|
| EP | 1 450 423 A1 | 8/2004 |
| JP | 2003-142095 A | 5/2003 |
| JP | 2009-117369 A | 5/2009 |
| JP | 2010-086693 A | 4/2010 |
| JP | 2011-091050 A | 5/2011 |
| JP | 2011-216485 A | 10/2011 |
| JP | 2012-043794 A | 3/2012 |
| JP | 2012-518871 A | 8/2012 |
| WO | WO 2005/064715 | 7/2005 |
| WO | WO 2010/094394 | 8/2010 |

OTHER PUBLICATIONS

International Search Report for PCT/EP2012/058896, mailed Oct. 4, 2012.

* cited by examiner

*Primary Examiner* — Nicole M Buie-Hatcher
*Assistant Examiner* — M. Reza Asdjodi
(74) *Attorney, Agent, or Firm* — Brinks Gilson & Lione

(57) ABSTRACT

The invention relates to cathode materials for Li-ion batteries having a size dependent compositions. The lithium metal oxide powder has a general formula $Li_aNi_xCo_yMn_zM'_mO_{2\pm e}A_f$, with $0.9<a<1.1$, $0.2 \le x \le 0.9$, $0<y \le 0.4$, $0<z \le 0.7$, $0 \le m \le 0.35$, $e<0.02$, $0 \le f \le 0.05$ and $0.9 < (x+y+z+m+f) < 1.1$; M' consisting of either one or more elements from the group Al, Mg, Ti, Cr, V, Fe and Ga; A consisting of either one or more elements from the group F, C, Cl, S, Zr, Ba, Y, Ca, B, Sn, Sb, Na and Zn. The powder has a particle size distribution defining a D10 and a D90; wherein either $x1-x2 \ge 0.005$; or $z2-z1 \ge 0.005$; or both $x1-x2 \ge 0.005$ and $z2-z1 \ge 0.005$; x1 and z1 being the values of x and z of particles having a particle size D90; and x2 and z2 being the values of x and z of particles having a particle size D10.

11 Claims, 5 Drawing Sheets

20 μm

5 μm

20 μm

5 μm

POSITIVE ELECTRODE MATERIAL HAVING A SIZE DEPENDENT COMPOSITION

This application is a National Stage application of International Application No. PCT/EP2012/058896, filed May 14, 2012, which claims the benefit of U.S. Provisional Application No. 61/457,825, filed Jun. 13, 2011. This application also claims priority under 35 U.S.C. §119 to European Patent Application No. 11168124.3, filed May 30, 2011.

TECHNICAL FIELD AND BACKGROUND

The invention relates to cathode materials for Li-ion batteries, having the general formula $Li_aNi_xCo_yMn_zM'_mO_{2\pm e}A_f$ (M' being either one or more of Al, Mg, Ti, Cr, V, Fe, Ga; and A being either one or more of F, C, Cl, S, Zr, Ba, Y, Ca, B, Sn, Sb, Na and Zn) with a non-homogeneous Ni/Mn ratio in the particles, and having superior capacity, rate and fade rate characteristics. Also a method to manufacture these materials is disclosed.

Due to their high energy density, rechargeable lithium and lithium-ion batteries can be used in a variety of portable electronics applications, such as cellular phones, laptop computers, digital cameras and video cameras. Commercially available lithium-ion batteries typically consist of graphite-based anode and $LiCoO_2$-based cathode materials. However, $LiCoO_2$-based cathode materials are expensive and typically have a relatively low capacity of approximately 150 mAh/g.

Alternatives to $LiCoO_2$-based cathode materials include LNMCO type cathode materials. LNMCO means lithium-nickel-manganese-cobalt-oxide. The composition is $LiMO_2$ or $Li_{1+x}M_{1-x}O_2$ where $M=Ni_xCo_yMn_zM'_m$. LNMCO has a similar layered crystal structure as $LiCoO_2$ (space group r-3m). The advantage of LNMCO cathodes is the much lower raw material price of the composition M versus Co. The addition of Ni gives an increase in discharge capacity, but is limited by a decreasing thermal stability when increasing the Ni content. In order to compensate for this problem, Mn is added in the structure as a stabilizing element, but at the same time some capacity is lost.

The preparation of LNMCO is in most cases more complex than $LiCoO_2$, because special precursors are needed wherein the transition metal cations are well mixed. Typical precursors are mixed transition metal hydroxides, oxyhydroxides or carbonates. Typical cathode materials include compositions having a formula $LiNi_{0.5}Mn_{0.3}Co_{0.2}O_2$, $LiNi_{0.6}Mn_{0.2}Co_{0.2}O_2$ or $Li_{1.05}M_{0.95}O_2$, with $M=Ni_{1/3}Mn_{1/3}Co_{1/3}O_2$. Compared with $LiClO_2$, LNMCO tends to have a lower bulk diffusion rate of lithium, which can limit the maximum possible particle size for a given composition. Depending on the composition, the safety of the charged cathode in a real cell can be a problem. Safety events ultimately are caused by reactions between the oxidized surface and the reducing electrolyte. Thus safety problems are typically more severe if the particles have a high surface area, which is the case if the particle size is small. The conclusion is that the lower performance of LNMCO requires a small particle size which deteriorates safety. It follows that for the "$LiNi_xCo_yMn_zO_2$" system, where the presence of given amounts of Ni and Mn are focused both on improving power behaviour and stabilizing the structure, a homogenous composition both for small and large particles leads to a compromise between power and safety performance, due to the unavoidable spread of particle size. Indeed, for the small particles in which safety behaviour is directly related to Mn content, a higher Mn concentration would be needed to achieve the same safety behaviour as for larger particles. On the other hand, the increase of the nickel content in the large particles could enhance the performances of the $LiNi_xCo_yM_zO_2$ system. The present invention provides a solution to this problem.

SUMMARY

Viewed from a first aspect, the invention can provide a lithium metal oxide powder for use as a cathode material in a rechargeable battery, having a general formula $Li_aNi_xCo_yMn_zM'_mO_{2\pm e}A_f$ with $0.9<a<1.1$, $0.2\leq x\leq 0.9$, $0<y\leq 0.4$, $0<z\leq 0.7$, $0\leq m\leq 0.35$, $e<0.02$, $0\leq f\leq 0.05$ and $0.9<(x+y+z+m+f)<1.1$;

M' consisting of either one or more elements from the group Al, Mg, Ti, Cr, V, Fe and Ga; A consisting of either one or more elements from the group F, C, Cl, S, Zr, Ba, Y, Ca, B, Sn, Sb, Na and Zn; the powder having a particle size distribution defining a D10, D50 and D90; and the x and z parameters varying with the particles size of the powder, where either one or both of: $x1-x2\geq 0.005$ and $z2-z1\geq 0.005$; x1, y1 and z1 being the parameters corresponding to particles having a particle size D90; and x2, y2 and z2 being the parameters corresponding to particles having a particle size D10. In one embodiment the Ni content of the powder increases with increasing particle size, and the Mn content of the powder decreases with increasing particle size. The Ni content may increase continuously, and the Mn content may decrease continuously, resulting in a Ni/Mn ratio that varies continuously with particle size. In another embodiment $-0.005\leq y1-y2\leq 0.005$, since a variation of the Co content as a function of particle size is not needed for achieving better safety. In some embodiments m=0 and f=0; and in the resulting $Li_aNi_xCo_yMn_zO_2$ compound has a composition wherein either one the following is valid:

a) $0.30\leq x\leq 0.40$, $0.30\leq y\leq 0.35$ and $0.25\leq z\leq 0.35$;
b) $0.45\leq x\leq 0.55$, $0.15\leq y\leq 0.25$ and $0.25\leq z\leq 0.35$;
c) $0.60\leq x\leq 0.70$, $0.10\leq y\leq 0.20$ and $0.20\leq z\leq 0.30$; and
d) $0.20\leq x\leq 0.30$, $0.05\leq y\leq 0.15$ and $0.60\leq z\leq 0.70$.

It should be mentioned here that WO2005/064715 describes a cathode active material comprising a lithium transition metal oxide $Li_aM_bO_2$, with $M=A_zA'_zM'_{1-z-z'}$, M' being $Mn_xNi_yCo_{1-x-y}$, A=Al, Mg or Ti and A' being a further dopant, where $0\leq x\leq 1$, $0\leq y\leq 1$, $0\leq z+z'<1$, $z'<0.02$. The composition M of this product varies with the size of the particles. In particular, smaller particles contain less cobalt and more manganese than larger particles. The Ni, Al, Mg and Ti contents however do not vary. In WO2010/094394 a cathode active material is disclosed, having a general formula $Li_aNi_xCo_yM_zO_{2\pm e}A_f$ with $0.9<a<1.1$, $0.3\leq x\leq 0.9$, $0<y\leq 0.4$, $0<z\leq 0.35$, $e<0.02$, $0\leq f\leq 0.05$ and $0.9<(x+y+z+f)<1.1$; M consisting of either one or more elements from the group Al, Mg and Ti; A consisting of either one or both of S and C. The content of Ni and M varies with the particle size of the powder: for a large particle size the Ni content is higher than for a small particle size, and for a large particle size the M content is lower than for a small particle size. It is not obvious to combine these two teachings, since in the former both the Co and Mn contents vary, whereas in the latter the Ni and M=Al, Mg, Ti contents vary, and there is no Mn present.

Viewed from a second aspect, the invention can provide a process for preparing the powderous lithium transition metal oxide described above, comprising the steps of:

providing a M-precursor powder, with $M=Ni_xCo_yMn_zM'_mA_f$ and having a particle size distribution defining a D10 and a D90; wherein either x1−x2≥0.005; or z2−z1≥0.005; or both x1−x2≥0.005 and z2−z1≥0.005; x1 and z1 being the values of x and z of particles having a particle size D90; and x2 and z2 being the values of x and z of particles having a particle size D10, mixing the M-precursor powder with a lithium precursor, preferably lithium carbonate, and heating the mixture at a temperature of at least 800° C.

In one embodiment the difference between the Co content of the M-precursor powder having a lower D10 and D90 value, and the Co content of the M-precursor powder having a higher D10 and D90 value, is less than each one of the differences between the Ni and Mn contents of the M-precursor powders. By M-precursor powder is understood that these powders are precursors of the $Li_aNi_xCo_yMn_zM'_mO_{2\pm e}A_f$ lithium transition metal oxides, such as provided in some embodiments: hydroxide or oxyhydroxide compositions obtained by precipitating metal sulphates, nitrates, chlorides or carbonates in the presence of an alkali hydroxide and a chelating agent, preferably ammonia.

Viewed from a third aspect, the invention can provide the use of the powders according to the first aspect in a Li secondary battery. In that use, the powderous lithium transition metal oxide may be mixed with a binder material and a solvent into a slurry, and the slurry is coated on an Al-foil forming the positive cathode of the Li secondary battery. By combining the cathode with an anode and adding an electrolyte a secondary battery is manufactured.

DETAILED DESCRIPTION

Figure 1:
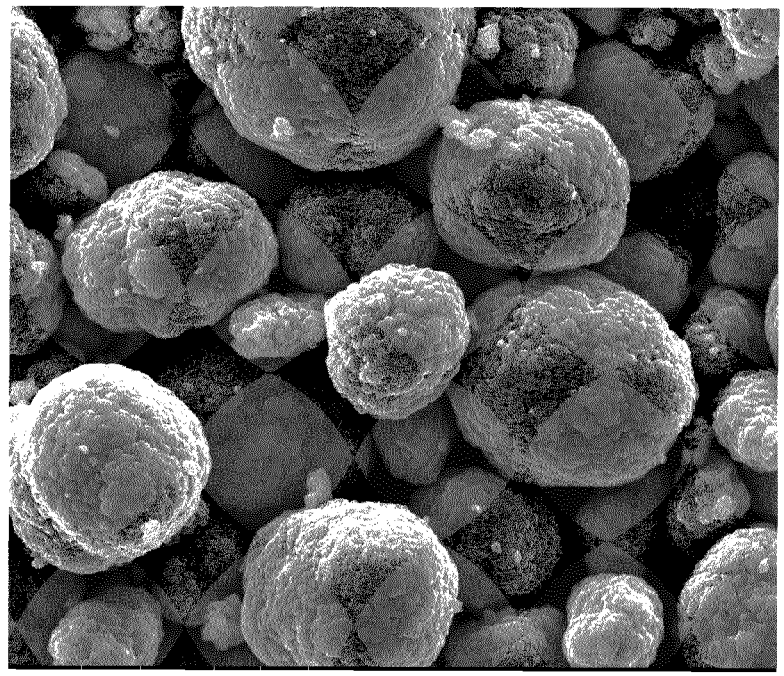
FIG. 1: SEM micrographs of the sample MX0150 with size dependent composition.
Figure 1:
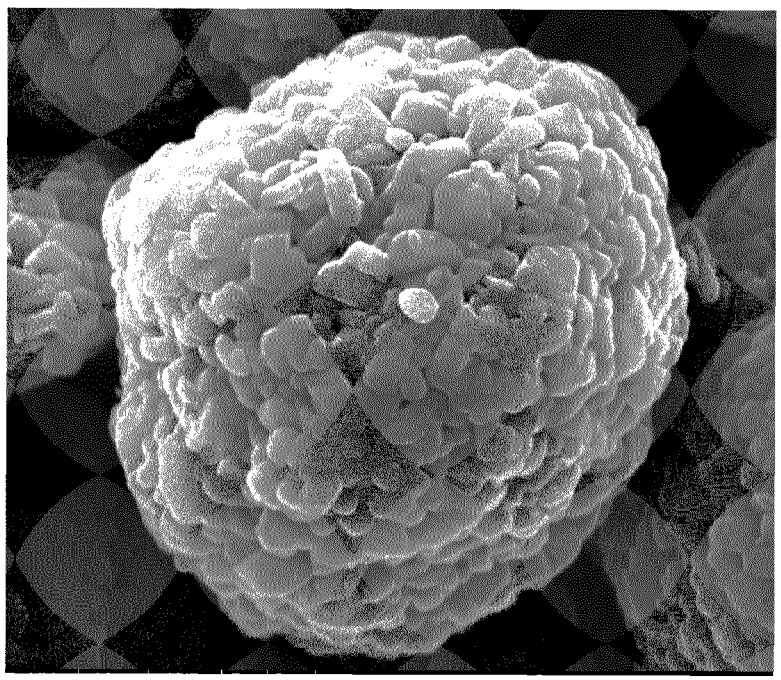

In an embodiment of the invention, the preparation of a final product having a size dependent composition may be performed by either one of the following methods:

A) providing at least 2 different transition metal precursors with different size of particles, where the smaller particle sized precursor has a smaller Ni:Mn ratio, followed by a separate lithiation firing, and then mixing the lithiated products, followed by a lithiation firing, or B) providing one (mixed) precursor which contains different sized particles where the smaller particles have a smaller Ni:Mn ratio, followed by a lithiation firing, where in both A) and B) the lithiation firing includes the mixing of the precursor(s) with a suitable source of lithium, such as Lithium carbonate or Lithium hydroxide, and using an appropriate Li:M blend ratio (e.g. 1.04:1.0), followed by a firing in a flow of air or oxygen at elevated temperature, to obtain the final product. The final product maintains the size dependent variation of composition i.e. where small particles have smaller Ni:Mn than larger sized particles.

The mixed transition metal precursors are typically obtained from a precipitation reaction. The size dependent composition is obtained by adjusting the precipitation parameters and quantities of the aqueous mixture of the different nickel, cobalt and manganese sulphates, (or nitrates, chlorides or carbonates) and alkali hydroxide.

By using this method, for a final size dependent $Li_aNi_xCo_yMn_zO_2$ powder with a D50 of around 10 μm and a mean Ni/Mn ratio of approx. 1, it is for example possible to start from 3 NMC hydroxide precursors, one having a D50 of around 6 μm and a Ni/Mn ratio of approx. 0.95; one having a D50 of around 10 μm and a Ni/Mn ratio of approx. 1; and one having a D50 of around 14 μm and a Ni/Mn ratio of approx. 1.05. By mixing the 3 precursors in equal quantities, and firing the mixture at a normal temperature of 800-1000° C., a size dependent $Li_aNi_xCo_yMn_zO_2$ powder is obtained that has superior electrochemical performances than an equivalent non-size dependent powder obtained from simply sintering the precursor having a D50 of around 10 μm and a Ni/Mn ratio of approx. 1.

Size dependent lithium transition metal oxide powders—compared with oxide powders without size dependent composition—have improved performance. For example for a typical $LiNiMnCoO_2$ powder with Ni:Mn:Co=33:33:33 an increase in reversible capacity of about 2 mAh/g less, in rate performance of about 1.5% and in cycling stability of about 3% less capacity loss may be obtained.

If the difference in either one of the Ni and Mn contents is less than 0.5 mol % between the D10 and the D90 fraction of the finally obtained powder, the size dependent composition is not varying enough to yield advantages that outweigh the need for providing for example two or more precursors with different PSD and composition. With differences of at least 1 mol % the resulting advantages in electrochemical performance are more significant.

Since varying the nickel and manganese contents offers a cheap way of increasing the capacity and safety of cobalt containing lithium oxide compounds, there is no benefit in varying also the cobalt content. By selecting precursor compounds having approximately the same Co contents, in the final product the Co content varies less with size than the Ni and Mn contents.

The $Li_aNi_xCo_yMn_zM'_mO_{2\pm e}A_f$ compositions for which a size dependent powder offers benefits can be for example (the list not being limitative): undoped NMC compositions like Ni:Mn:Co=33:33:33; 50:30:20; 38:29:33; 40:40:20; 50:40:10; 60:20:20; 53:27:20; 22:67:11; and doped compositions with M'=Al like Ni:Mn:Co:Al=42:36:14:8. In other embodiments A may be up to 0.6 mol % sulphur, and M' may be up to 0.15 wt % Ca. In still other embodiments M' may be each one or both of between 0.1 and 0.25 mol % Ti and between 0.1 and 2 mol % Mg.

The invention is further illustrated in the following examples:

Example 1

In a first step, a composite Ni—Mn—Co (or NMC) hydroxide precursor with molar composition 32.8:34.6:32.6 is precipitated from Ni, Mn and Co sulphates in the presence of NaOH and ammonia. The obtained NMC hydroxide has a spherical shape and the average particle size as measured from laser granulometry is centered around D50=6.5 μm (D10=4.1 μm, D90=10.2 μm).

In a second step, a NMC hydroxide precursor with molar composition 33.4:34.1:32.5 is precipitated from Ni, Mn and Co sulphates in the presence of NaOH and ammonia. The obtained NMC hydroxide shows spherical shape and the average particle size as measured from laser granulometry is centered around D50=10.5 µm (D10=7.5 µm, D90=14.7 µm).

In a third step, a NMC hydroxide precursor with molar composition 34.1:33.4:32.5 is precipitated from Ni, Mn and Co sulphates in the presence of NaOH and ammonia. The obtained NMC hydroxide shows spherical shape and the average particle size as measured from laser granulometry is centered around D50=15.2 µm. (D10=10.8 µm, D90=21.3 µm).

In a last step, the three hydroxide precursor powders as synthesized above are mixed in the ratio 0.3:0.4:0.3 respectively to obtain a NMC hydroxide precursor with size dependent composition and a Ni:Mn:Co global composition as deduced from ICP of 33.2:34.4:32.6. The particle size distribution of the mixed NMC material is measured by laser diffraction granulometry and shows a PSD with D10=5.7 µm, D50=10.0 µm, D90=17.3 µm.

The above precursor with size dependent composition is used to prepare a series of lithium transition metal oxides at 3 different firing temperatures (see Table 2). Lithium nickel manganese cobalt oxide compounds generally allow for a lithium non-stoichiometric range, $Li_{1+x}M_{1-x}O_2$. We chose a slightly Li rich composition (x=0.01 . . . 0.02) which is achieved by using a blend ratio (Li in $Li_2CO_3$ to M in $M(OH)_2$ of 1.04). The mixed metal precursor and $Li_2CO_3$ are mixed in an appropriate ratio, followed by firing in air for 10 hours.

Sample MX0150 (fired at 950° C.) is further investigated by SEM (see FIG. 1), pH titration, and BET surface analysis. pH titration (using 7.5 g sample in 100 ml $H_2O$, 10 min stirring, then filtering) yields that 19.3 micro-mol of HCl are needed per g of sample to achieve a pH of 4.5. The surface area is measured to be 0.415 $m^2/g$.

The metal composition of the obtained $Li_aNi_xCo_yMn_zO_2$ powder (MX0150) as deduced from ICP is Ni:Mn:Co 33.3:34.1:32.6. The particle size distribution of the product after firing is measured by laser diffraction granulometry and shows a PSD with D10=5.5 µm, D50=10.4 µm, D90=19.3 µm. A size vs. composition analysis is performed on the $LiNi_xCo_yMn_zO_2$ material made according to the above (see FIG. 2).

The following experiment confirms that the final powder has retained the size dependent composition introduced in the precursor: the composition of different fractions of the final powder is measured by ICP, where the different fractions (with different particle size) are obtained by elutriation. In an elutriation experiment, powders are separated by settling down in a slow upward flow of liquid. Thus small particles reach the overflow early, large particles later. The particle size of the different fractions is measured using laser diffraction granulometry. This clearly shows that the chemical composition (Ni:Mn:Co) of the final product is varying as a function of its particle size (see FIG. 2). The figure clearly shows that the Ni/Mn ratio varies continuously with particle size.

Figure 2:
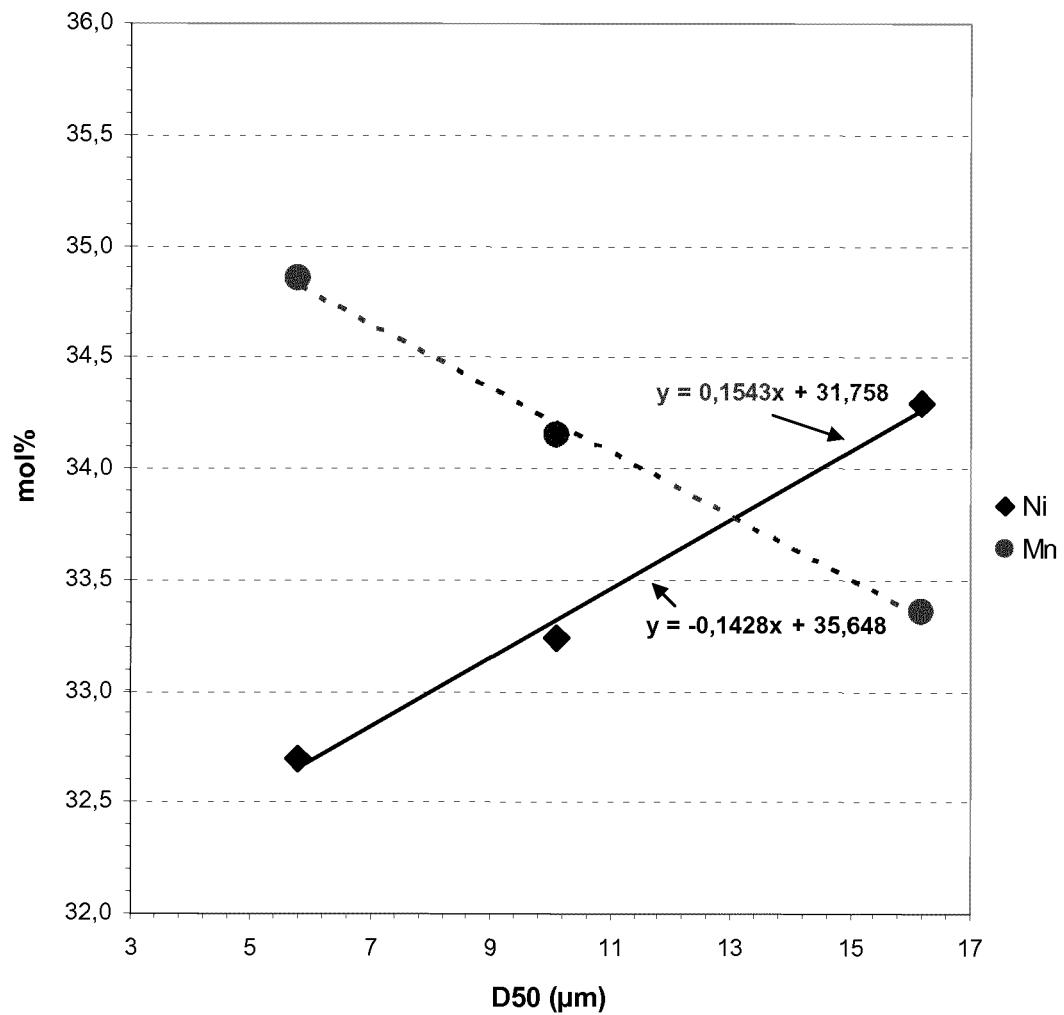
FIG. 2: Variation of the Ni and Mn content (in mol %) as a function of particle size (D50) in an embodiment sample of the invention.

From FIG. 2, it can be concluded that the values for D10 and D90 should be as in Table 1:

TABLE 1

| particle size | Size (µm) | Ni (mol %) | Mn (mol %) |
|---|---|---|---|
| D90 | 19.3 | >34.5 | <33.0 |
| D10 | 5.5 | <32.7 | >34.8 |

As can be deduced from FIG. 2, there is a very good correlation between Ni and Mn content (mol %) and particle size (D) as measured from laser granulometry. In an embodiment of the invention, the dependency (in % mol) of Ni and Mn with particle size D follows a linear trend: % mol Ni=s×D+t1, and % mol Mn=u×D+t2, with s>0 or Abs(s)≥0.05, preferably 0.1; and/or with u<0 or Abs(u)≥0.05, preferably 0.1.

For Example 1 the linear trend (mol % Ni=s·D+t1 and mol % Mn=u·D+t2) is:
for Ni: Ni (mol %)=0.1543×D+31.758
for Mn: Mn (mol %)=−0.1428×D+35.648.

Further in the example, a slurry is prepared by mixing the $LiNi_xCo_yMn_zO_2$ powder with size dependent composition with 5% wt carbon black and 5% PVDF into N-Methyl Pyrrolidone (NMP), and is deposited on an Al foil as current collector. The obtained electrode containing 90% wt active material is used to manufacture coin cells with about 14 $mg/cm^2$ active material. As electrolyte a $LiPF_6$ based electrolyte is used. The negative electrodes are made of metallic Li. Capacity and rate performance of the coin cells are tested between 3.0 and 4.3V vs Li+/Li, followed by a stability test at 4.5-3.0V (as of Cycle 7, at 1 C). Before and after the stability test, the capacity is measured at slow (C/10) and fast (1 C) rate. The fade rate is obtained after 23 cycles—cycling between 4.5 and 3.0V, and its value is extrapolated to 100 cycles.

Table 2 shows the obtained electrochemical properties for the series of lithium transition metal oxides obtained at different firing temperatures. The displayed values each are the average of 2 coin cells. Reproducibility is excellent. A good performance is achieved for all 3 firing temperatures. For the sake of clarity only the coin cell testing of sample MX0150 is discussed further in detail and shown in FIG. 3.

Figure 3:
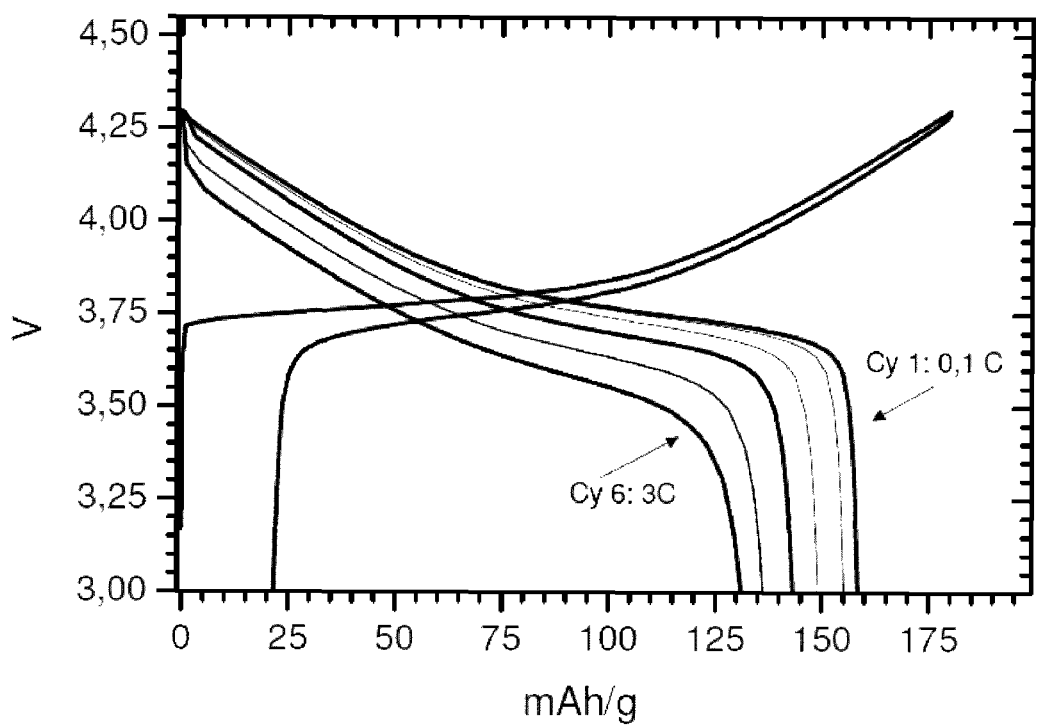
FIG. 3: Coin cell testing details of sample MX0150 prepared at 950° C. from a NMC hydroxide precursor with size dependent composition.

FIG. 3 shows that a high reversible capacity is obtained upon cycling with a reversible capacity of 158.5 mAh/g at a discharge rate of C/10 (Cycle 1: full discharge in 10 h). In the figure the voltage is shown against the cathode capacity during 6 consecutive cycles—the discharge capacities of the cycles are shown from right to left for Cycle 1 to Cycle 6. 86, 1% of the capacity is retained at a discharge rate of 2 C (Cycle 5: full discharge in ½h) with 136.7 mAh/g.

For completeness the cycles' discharge rate is listed here: Cycle 1: C/10 (1st to the right on FIG. 3), Cycle 2: C/5, Cycle 3: C/2, Cycle 4: 1 C, Cycle 5: 2 C, and Cycle 6: 3 C (most left on FIG. 3).

TABLE 2

Preparation and electrochemical performance of Li—M—$O_2$ prepared from a NMC hydroxide precursor with size dependent composition

|  | Sinter T ° C. | Reversible Capacity 0.1 C, 4.3 V | Irreversible capacity % | Rate 2 C/ 0.1 C % | Q Fade rate 1 C %/100 cycles |
|---|---|---|---|---|---|
| MX0149 | 900 | 156.6 | 13.1 | 83.8 | 3.9 |
| MX0150 | 950 | 158.5 | 12.0 | 86.1 | 8.3 |
| MX0151 | 1000 | 157.9 | 12.3 | 85.4 | 11.7 |

Counter Example 2

In a first step, an NMC hydroxide material with molar composition 33.1:33.6:33.3 (without size dependent composition) is precipitated from Ni, Mn and Co sulphates in the presence of NaOH and Ammonia. The average particle size is measured from laser granulometry and shows a PSD with D10=5.1 µm, D50=9.1 µm, D90=16.4 µm. The above precursor without size dependent composition is used to prepare a series of lithium transition metal oxides at 3 different firing temperatures (see Table 3). As before, we chose a slightly Li rich composition (x=0.01 . . . 0.02) which is achieved by using a blend ratio (Li in $Li_2CO_3$ to M in $M(OH)_2$ of 1.04) Table 3 summarizes the preparation. The mixed metal precursor and $Li_2CO_3$ are mixed in an appropriate ratio, followed by firing in air for 10 hours.

Figure 4:
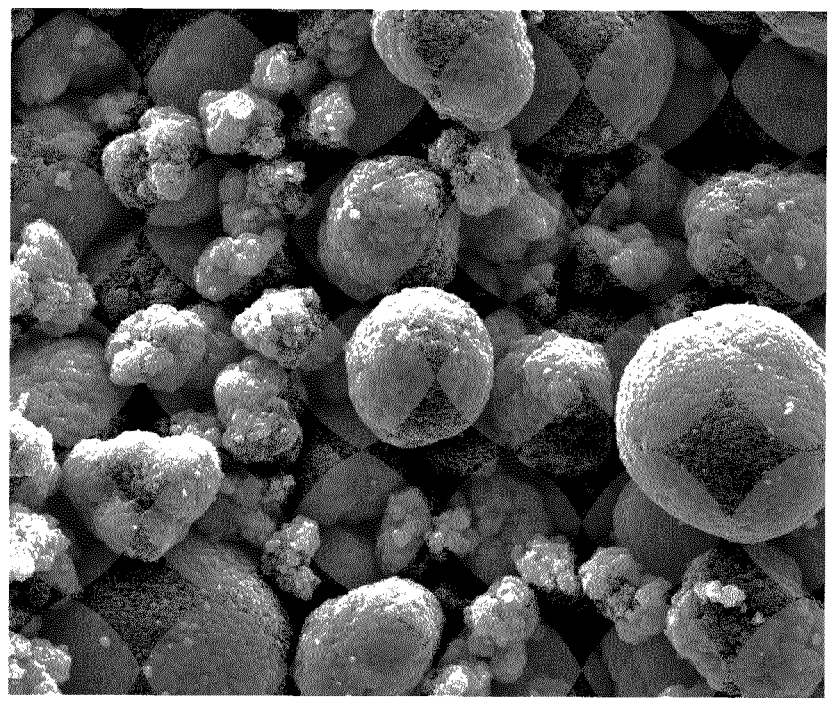
FIG. 4: SEM micrographs of the sample MX0153 without size dependent composition.
Figure 4:
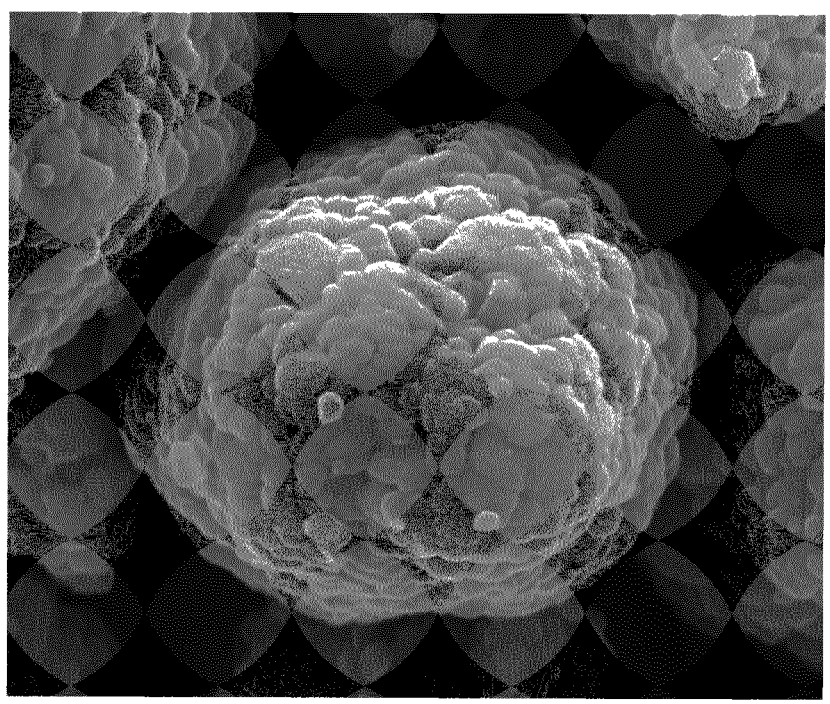

Sample MX0153 (fired at 950° C.) is further investigated by SEM (see FIG. 4), pH titration, and BET surface analysis. pH titration (using 7.5 g sample in 100 ml $H_2O$, 10 min stirring, then filtering) yields that 21.63 micro-mol of HCl are needed per g of sample to achieve a pH of 4.5. The surface area is measured to be 0.442 $m^2/g$. Generally, the morphology is very similar to those of sample MX0150 of Example 1.

Figure 5:
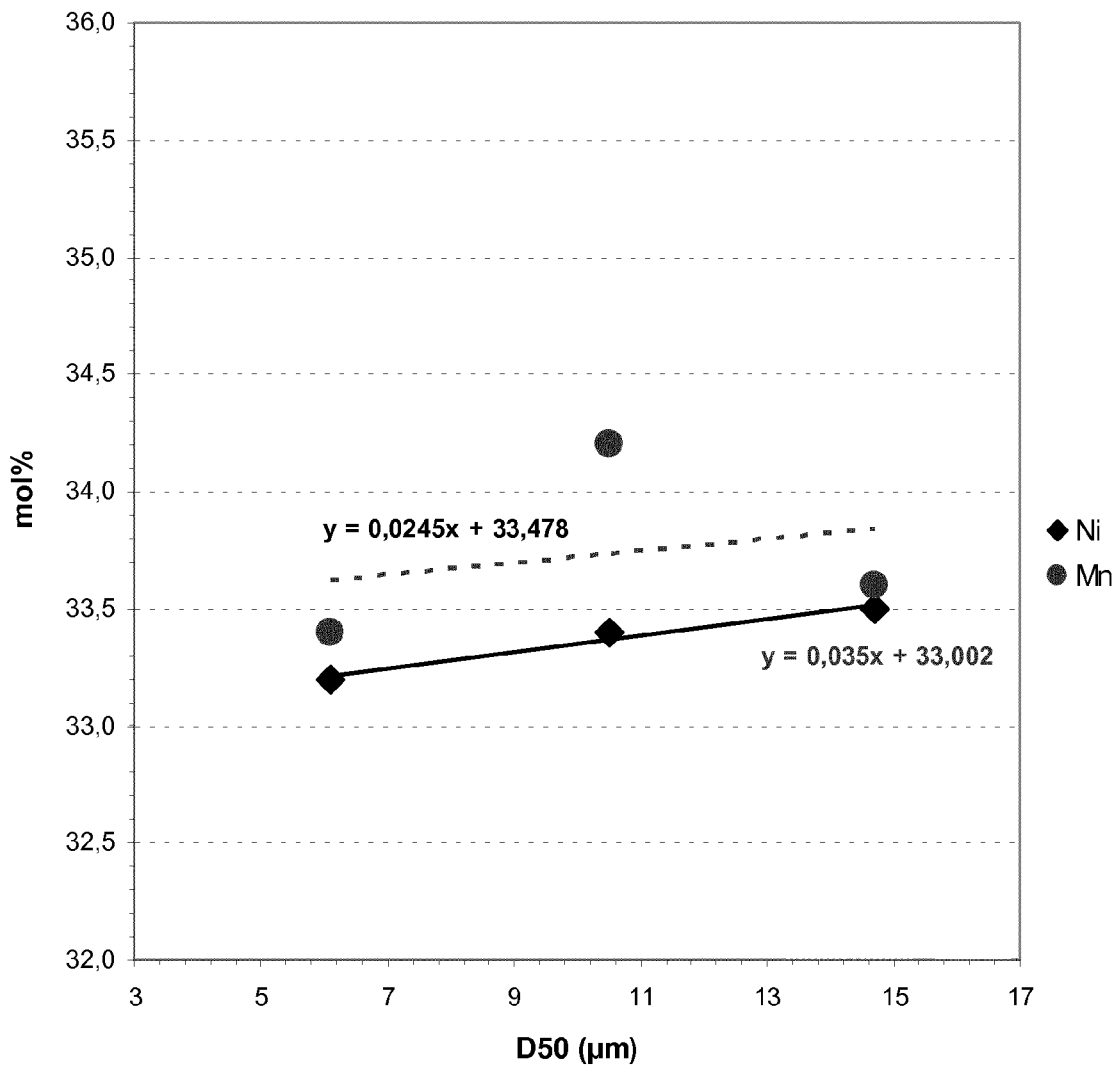
FIG. 5: Variation of the Ni and Mn content (in mol %) as a function of particle size (D50) in sample MX0153 without size dependent composition.

The global composition of the obtained $Li_aNi_xCo_yMn_zO_2$ powder (MX0153) as deduced from ICP is Ni:Mn:Co 33.1:33.7:33.2. The particle size distribution of the product after firing is measured by laser diffraction granulometry and shows a PSD with D10=5.2 µm, D50=9.5 µm, D90=17.6 µm (nearly identical to Example 1). A size vs. composition analysis is performed on the $LiNi_xCo_yMn_zO_2$ material is a similar way as described in Example 1 to proof that the final powder has no size dependent composition (see FIG. 5).

This graph clearly shows that the Ni/Mn ratio does not vary with particle size. As can be deduced from FIG. 5, there is a no correlation between Ni and Mn content (mol %) and particle size as measured from laser granulometry (D). Indeed the calculated trends are:

for Ni: Ni (mol %)=0.035×D+33.002
for Mn: Mn (mol %)=−0.0245×D+33.478

The s and u factor in the equations (mol %=s (or u)×D+t1 (or t2)) being close to 0 confirms that the Ni and Mn contents are constant in the powder.

Further in the experiment, a slurry is prepared by mixing the $LiNi_xCo_yMn_zO_2$ powder (without size dependent composition) with 5% wt carbon black and 5% PVDF into N-Methyl Pyrrolidone (NMP), and is deposited on an Al foil as current collector. The obtained electrode containing 90% wt active material is used to manufacture coin cells with about 14 mg/$cm^2$ active material. As electrolyte a $LiPF_6$ based electrolyte is used. The negative electrodes are made of metallic Li. Capacity and rate performance of the coin cells are tested between 3.0 and 4.3V vs Li+/Li, followed by a stability test at 4.5-3.0V (at 1 C). Before and after the stability test, the capacity is measured at slow (C/10) and fast (1 C) rate. The fade rate is obtained after 23 cycles cycling between 4.5 and 3.0V, and its value is extrapolated to 100 cycles.

Table 3 shows the obtained electrochemical properties of the series of lithium transition metal oxides obtained at different firing temperatures. The displayed values are the average of 2 coin cells. Reproducibility is excellent. In all 3 cases the coin cell performance is inferior compared with those of Example 1. The reversible capacity is about 2 mAh/g less and the rate performance is about 1.5% less and cycling stability is about 3% less as well, thereby clearly illustrating the advantage of having a size dependent composition.

TABLE 3

Preparation and electrochemical performance of Li—M—$O_2$ prepared from a mixed metal precursor without size dependent composition

| | Sinter T ° C. | Reversible Capacity 0.1 C, 4.3 V | Irreversible capacity % | Rate 2 C/ 0.1 C % | Q Fade rate 1 C %/100 cycles |
|---|---|---|---|---|---|
| MX0152 | 900 | 155.0 | 13.8 | 82.6 | 7.6 |
| MX0153 | 950 | 155.9 | 13.4 | 84.3 | 11.4 |
| MX0154 | 1000 | 156.1 | 13.7 | 84.0 | 13.4 |

While specific embodiments and/or details of the invention have been shown and described above to illustrate the application of the principles of the invention, it is understood that this invention may be embodied as more fully described in the claims, or as otherwise known by those skilled in the art (including any and all equivalents), without departing from such principles.

The invention claimed is:

1. A lithium metal oxide powder for use as a cathode material in a rechargeable battery, having a general formula $Li_aNi_xCo_yMn_zM'_mO_{2\pm e}A_f$, with $0.9<a<1.1$, $0.2\leq x\leq 0.9$, $0<y\leq 0.4$, $0<z\leq 0.7$, $m=0$, $e<0.02$, $f=0$ and $0.9<(x+y+z+m+f)<1.1$;

M' comprising one or more elements selected from the group consisting of Al, Mg, Ti, Cr, V, Fe and Ga; A comprising one or more elements selected from the group consisting of F, C, Cl, S, Zr, Ba, Y, Ca, B, Sn, Sb, Na and Zn; the powder having a particle size distribution defining a D10 and a D90; and wherein either
x1−x2≥0.005; or
z2−z1≥0.005; or
both x1−x2≥0.005 and z2−z1>0.005;
x1 and z1 being the values of x and z of particles having a particle size D90; and x2 and z2 being the values of x and z of particles having a particle size D10, and wherein −0.005≤y1−y2≤0.005, y1 being the value of y of particles having a particle size D90; and y2 being the value of y of particles having a particle size D10, and one of
a) 0.30≤x≤0.40, 0.30≤y≤0.35 and 0.25≤z≤0.35;
b) 0.45≤x≤0.55, 0.15≤y≤0.25 and 0.25≤z≤0.35;
c) 0.60≤x≤0.70, 0.10≤y≤0.20 and 0.20≤z≤0.30; and
d) 0.20≤x≤0.30, 0.05≤y≤0.15 and 0.60≤z≤0.70.

2. The oxide powder of claim 1, wherein both x1−x2≥0.010 and z2−z1>0.010.

3. The oxide powder according to claim 1, wherein the Ni content of the powder increases with increasing particle size, and the Mn content of the powder decreases with increasing particle size.

4. The oxide powder according to claim 1, wherein A comprises S and C and M' comprises Mg and/or Al.

5. The oxide powder according to claim 4, wherein A comprises C and M' comprises Al.

6. A process for the manufacture of a powder according to claim 1, comprising:
providing a M-precursor powder, with M=$Ni_xCo_yMn_zM'_mA_f$ and having a particle size distribution defining a D10 and a D90; wherein either x1−x2≥0.005; or z2−z1≥0.005; or both x1−x2≥0.005 and z2−z1≥0.005; x1 and z1 being the values of x and z of particles having a particle size D90; and x2 and z2 being the values of x and z of particles having a particle size D10, mixing the M-precursor powder with a lithium precursor, and heating the mixture at a temperature of at least 800° C.

7. The process according to claim 6, wherein providing a M-precursor powder comprises:

providing at least two M-precursor powders having different particle size distributions characterized by different D10 and D90 values, wherein a M-precursor powder having a lower D10 and D90 value has one or both of a lower Ni content and a higher Mn content, than a M-precursor powder having a higher D10 and D90 value; and mixing the at least two M-precursor powders.

8. The process according to claim 7, wherein the at least two M-precursor powders are mixed with a lithium precursor, before heating the mixture at a temperature of at least 800° C.

9. The process according to claim 7, wherein both the Ni content of the powder having a lower D10 and D90 value is lower than the Ni content of the powder having a higher D10 and D90 value, and the Mn content of the powder having a lower D10 and D90 value is higher than the Mn content of the powder having a higher D10 and D90 value.

10. The process according to claim 9, wherein the difference between the Co content of the M-precursor powder having a lower D10 and D90 value, and the Co content of the M-precursor powder having a higher D10 and D90 value, is less than each one of the differences between the Ni and Mn contents of the M-precursor powders.

11. The process according to claim 6, wherein the M-precursor powder comprises hydroxide or oxyhydroxide compositions obtained by precipitating metal sulphates, nitrates, chlorides or carbonates in the presence of an alkali hydroxide and a chelating agent.

* * * * *